(12) United States Patent
Chang et al.

(10) Patent No.: US 8,243,472 B2
(45) Date of Patent: Aug. 14, 2012

(54) POWER SUPPLY HAVING A TWO-WAY DC TO DC CONVERTER

(75) Inventors: Shun-Te Chang, Tamshui Chen (TW); Wei-Liang Lin, Tamshui Chen (TW)

(73) Assignee: Acbel Polytech Inc., Tamshui Chen, Taipei Hsien (TW)

( * ) Notice: Subject to any disclaimer, the term of this patent is extended or adjusted under 35 U.S.C. 154(b) by 527 days.

(21) Appl. No.: 12/459,428

(22) Filed: Jul. 1, 2009

(65) Prior Publication Data
US 2010/0165673 A1  Jul. 1, 2010

(30) Foreign Application Priority Data
Dec. 29, 2008 (TW) ................................. 97151184 A

(51) Int. Cl.
*H02M 3/335* (2006.01)
(52) U.S. Cl. .................. 363/16; 363/37; 363/89
(58) Field of Classification Search .................. 323/222, 323/271, 283, 285, 299; 363/15, 34, 37, 363/89, 16
See application file for complete search history.

(56) References Cited

U.S. PATENT DOCUMENTS

| | | | | |
|---|---|---|---|---|
| 4,736,151 A * | 4/1988 | Dishner | ........................ | 323/224 |
| 4,801,859 A * | 1/1989 | Dishner | ........................ | 323/224 |
| 5,373,195 A * | 12/1994 | De Doncker et al. | ........... | 307/45 |
| 5,734,258 A * | 3/1998 | Esser | ........................... | 323/224 |
| 6,115,276 A * | 9/2000 | Mao | .............................. | 363/127 |
| 6,795,322 B2 * | 9/2004 | Aihara et al. | ..................... | 363/37 |
| 6,807,073 B1 * | 10/2004 | Scarlatescu | ..................... | 363/34 |
| 7,262,978 B2 * | 8/2007 | Yamada | .......................... | 363/40 |
| 7,764,527 B2 * | 7/2010 | Takayanagi | ..................... | 363/65 |
| 7,812,575 B2 * | 10/2010 | Shimada et al. | .............. | 323/222 |
| 7,919,953 B2 * | 4/2011 | Porter et al. | .................. | 323/222 |
| 2005/0036340 A1 * | 2/2005 | Scarlatescu | ..................... | 363/34 |
| 2005/0078494 A1 * | 4/2005 | Aihara et al. | ..................... | 363/37 |
| 2006/0145677 A1 * | 7/2006 | Okamura | ...................... | 323/283 |
| 2008/0019154 A1 * | 1/2008 | Lanni | .............................. | 363/36 |
| 2008/0062724 A1 * | 3/2008 | Feng et al. | ....................... | 363/17 |
| 2011/0181251 A1 * | 7/2011 | Porter et al. | .................. | 323/222 |

* cited by examiner

*Primary Examiner* — Jeffrey Sterrett
(74) *Attorney, Agent, or Firm* — Charles E. Baxley

(57) ABSTRACT

A power supply having a two-way DC to DC converter has an AC to DC converter and a two-way DC to DC converter. When an AC power is input to the AC to DC converter, the AC to DC converter transforms the AC power to a middle level DC power and the two-way DC to DC converter transforms the middle level DC power to a low level DC power. When the AC power is unavailable and the two-way DC to DC converter obtains an external DC power, the two-way DC to DC converter transforms the external DC power to the middle level DC power. Therefore, if the power supply obtains the external DC power, the power supply can still output the middle level DC power even the AC power is unavailable.

14 Claims, 17 Drawing Sheets

POWER SUPPLY HAVING A TWO-WAY DC TO DC CONVERTER

BACKGROUND OF THE INVENTION

1. Field of the Invention

The present invention relates to a power supply, and more particularly to a power supply having a two-way DC to DC converter.

2. Description of Related Art

Portable electronic devices such as notebook computers, Personal Digital Assistants (PDAs) or the like are commonly used because they are convenient for users to carry and use. A critical drawback of the portable electronic devices is that the lifetime of batteries in the portable electronic devices is short. Before the batteries are running out of power, the users have to connect the portable electronic devices to utility power through a power supply to maintain normal the portable electronic devices operating.

A conventional power supply having additional power output and input ports is existed. The additional power input port is used to obtain a substitute DC power when the utility power is unavailable. The additional power output port additionally outputs a DC power to another electronic device other than the electronic device using the conventional power supply. With reference to FIGS. 11 and 12, the conventional power supply may be used with a notebook computer and a Universal Serial Bus (USB) device and comprises a AC to DC converter (51), a first DC to DC converter (52) and a second DC to DC converter (53). The AC to DC converter (51) comprises an input terminal (511), a full-wave rectifier (512), a power factor correction (PFC) circuit (513), a fly-back DC to DC converter (514) and an output terminal (515).

The AC to DC converter (51) receives an AC power such as utility power from the input terminal (511), rectifies and filters the AC power, converts the AC power to a middle level DC power such as 19 volts DC power and outputs the middle level DC power from the output terminal (515). The notebook computer obtains the middle level DC power as the operating power when the notebook computer is electrically connected to the output terminal (515) of the AC to DC converter (51). The first DC to DC converter (52) has an input terminal (521) and an output terminal (522). The input terminal (521) of the DC to DC converter (52) is connected to the output terminal (515) of the AC to DC converter (51) to obtain and convert the middle level DC power to a low level DC power. The output terminal (522) of the first DC to DC converter (52) outputs the low level DC power when the USB device is electrically connected to the output terminal (522) so the USB device obtains operating power. The second DC to DC converter (53) has an output terminal (531) and an input terminal (532). The output terminal (531) of the second DC to DC converter (53) is connected to the output terminal (515) of the AC to DC converter (51). The input terminal (532) of the second DC to DC converter (53) is connected to an external DC power maybe from a vehicle cigarette lighter at 12 to 16 volts. The second DC to DC converter (53) converts the external DC power to the middle level DC power. The output terminal (515) of the AC to DC converter (51) outputs the middle level DC power. The middle level DC power can also be converted to the low level DC power by the first DC to DC converter (52), and the output terminal (522) of the first DC to DC converter (52) outputs the low level DC power.

However, the conventional power supply has drawbacks as follow.

1. The conventional power supply has big size because the conventional power supply has two DC to DC converters (52, 53). More DC to DC converters (52, 53) also results in more power consumption.

2. When stay in an environment without utility power such as on vehicles, the users do not often use both the notebook computer and the USB device. In particular, when the conventional power supply obtains the external DC power rather than the AC power, the conventional power supply is mostly used to supply power to the notebook computer rather than the USB device so the first DC to DC converter (52) is ineffectual.

To overcome the shortcomings, the present invention provides a power supply having a two-way DC to DC converter to mitigate or obviate the aforementioned problems.

SUMMARY OF THE INVENTION

The main objective of the invention is to provide a power supply having a two-way DC to DC converter.

The power supply in accordance with the present invention comprises an AC to DC converter and a two-way DC to DC converter. When an AC power is input to the AC to DC converter, the AC to DC converter transforms the AC power to a middle level DC power and the two-way DC to DC converter transforms the middle level DC power to a low level DC power. When the AC power is unavailable and the two-way DC to DC converter obtains an external DC power, the two-way DC to DC converter transforms the external DC power to the middle level DC power. Therefore, if the power supply obtains the external DC power, the power supply can still output the middle level DC power even the AC power is unavailable.

With such a power supply, a single two-way DC to DC converter is required to either transform the middle level DC power to the low level DC power when the AC power is available or transform the external DC power to the middle level DC power so the power supply continues outputting the middle level DC power when the AC power is unavailable.

Other objectives, advantages and novel features of the invention will become more apparent from the following detailed description when taken in conjunction with the accompanying drawings.

DETAILED DESCRIPTION OF PREFERRED EMBODIMENT

Figure 1:
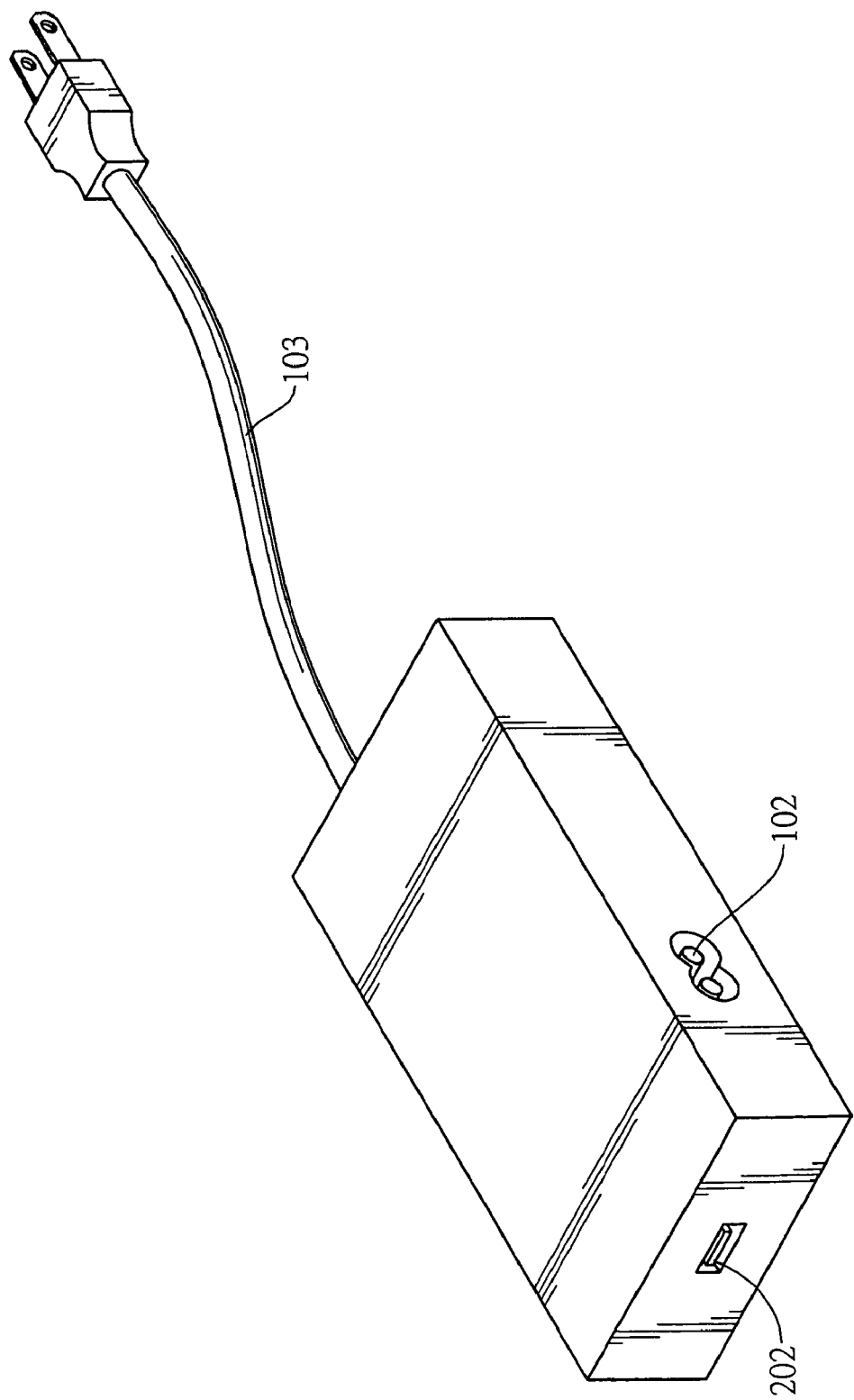
FIG. 1 is a perspective view of a power supply in accordance with the present invention.
Figure 2:
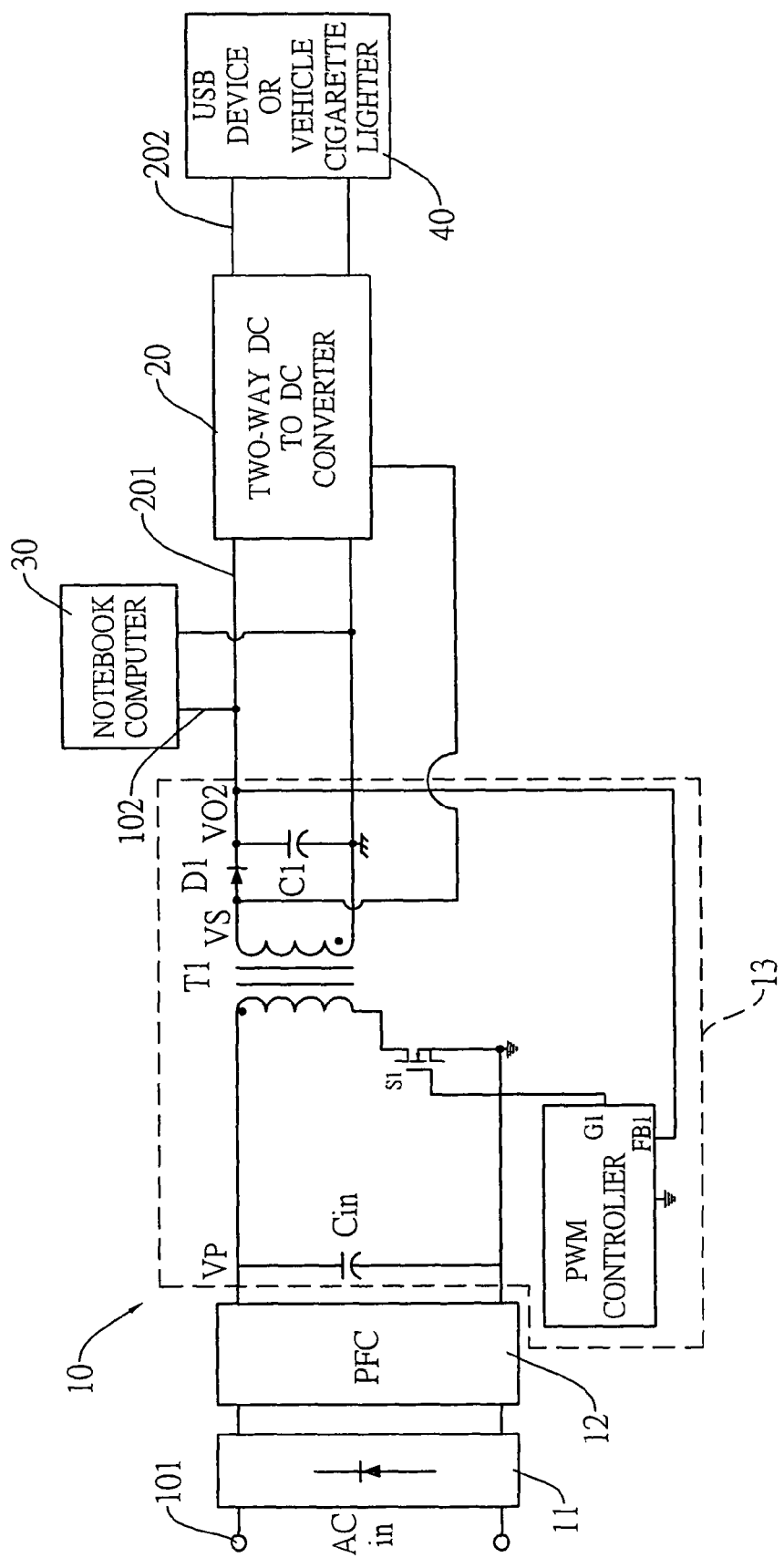
FIG. 2 is a functional block diagram of the power supply in FIG. 1.

With reference to FIGS. 1 and 2, a power supply in accordance with the present invention comprises an AC to DC converter (10) and a two-way DC to DC converter (20).

The AC to DC converter (10) has an input terminal (101) and an output terminal (102). The input terminal (101) obtains an AC power such as from the utility power through a plug (103). The AC to DC converter (10) obtains the AC power, rectifies and filters the AC power and converts the AC power to a middle level DC power. The output terminal (102) outputs the middle level DC power.

In addition, the AC to DC converter (10) may comprise a full-wave rectifier (11), an optional power factor correction (PFC) circuit (12) and a switch DC to DC converter (13).

The full-wave rectifier (11) is connected to the input terminal (101) of the AC to DC converter (10) and obtains and rectifies the AC power to a DC power.

The PFC circuit (12) is connected to the full-wave rectifier (11) and corrects power factors of the DC power from the full-wave rectifier (11).

The switch DC to DC converter (13) is connected to the PFC circuit (12) and the output terminal (102) of the AC to DC converter (10), converts the corrected DC power from the PFC circuit (12) to a middle level DC power and transmits the middle level DC power to the output terminal (102) of the AC to DC converter (10). For example, if a notebook computer (30) electrically connects to the output terminal (102), the middle level DC power is at 19 volts. Furthermore, the switch DC to DC converter (13) may be a fly-back converter having an input capacitor (Cin), a transformer (T1), a front electronic switch (S1) and a front pulse width modulation (PWM) controller. The transformer (T1) has a primary winding and a secondary winding. The front PWM controller of the switch DC to DC converter (13) has a switch control terminal (G1) and a feedback terminal (FB1).

The two-way DC to DC converter (20) has a first input and output (I/O) terminal (201) and a second I/O terminal (202). The first I/O terminal (201) is connected to the output terminal (102) of the AC to DC converter (10). The two-way DC to DC converter (20) determines either the first I/O terminal (201) or the second I/O terminal (202) to perform an input terminal or an output terminal based on whether the switch DC to DC converter (13) outputs the middle level DC power.

When the AC to DC converter (10) outputs the middle level DC power, the two-way DC to DC converter (20) transforms the middle level DC power to a low level DC power so the second I/O terminal (202) outputs the low level DC power. If the second I/O terminal (202) is allowed to connect a Universal Serial Bus (USB) device (40) and outputs the low level DC power, the low level DC power may be at 5 volts.

If the two-way DC to DC converter (20) does not obtain the middle level DC power from the AC to DC converter (10) but receives an external DC power such as from a vehicle cigarette lighter at 12 to 16 volts through the second I/O terminal (202), the two-way DC to DC converter (20) transforms the external DC power to the middle level DC power so the first I/O terminal (201) outputs the middle level DC power to the output terminal (102) of the AC to DC converter (10).

Figure 3:
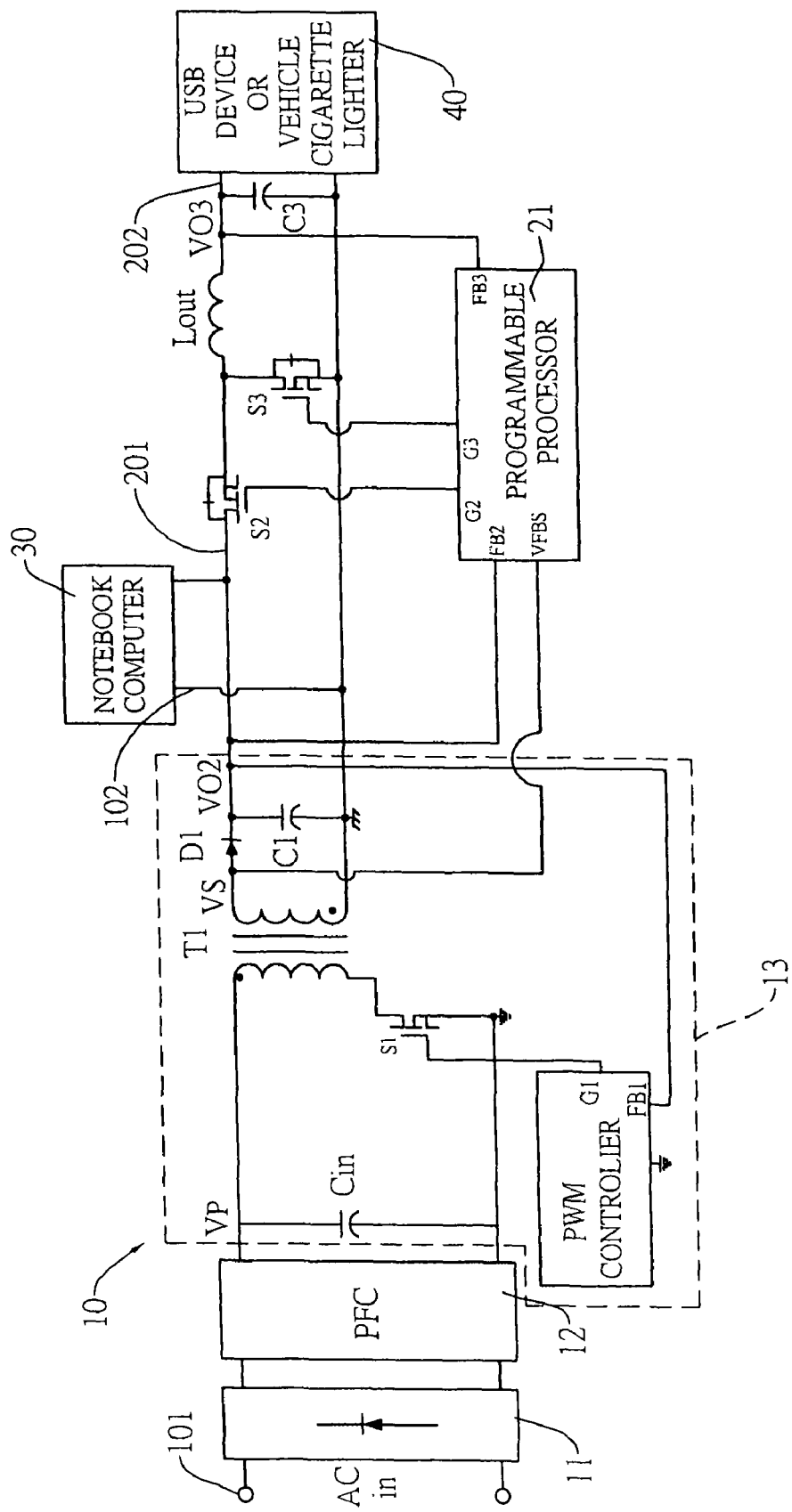
FIG. 3 is a functional block diagram of a first embodiment of a two-way DC to DC converter in FIG. 2.

With further reference to FIG. 3, the two-way DC to DC converter (20) may comprise an output inductor (Lout), an output capacitor (C3), a first electronic switch (S2), a second electronic switch (S3) and a control module.

The output inductor (Lout) has a first end and a second end.

The output capacitor (C3) is connected to the second end of the output inductor (Lout).

The first electronic switch (S2) is connected between the output terminal (102) of the AC to DC converter (10) and the first end of the output inductor (Lout). The first electronic switch (S2) may be a metal oxide semiconductor (MOS) transistor, a Bipolar Junction Transistor (BJT) or the like. For example, if the first electronic switch (S2) is a MOS transistor, the first electronic switch (S2) has a gate terminal, a drain terminal, a source terminal and a body diode. The drain terminal is connected to the output terminal (102) of the AC to DC converter (10). The source terminal is connected to the first end of the output inductor (Lout).

The second electronic switch (S3) is connected to the first electronic switch (S2) and the first end of the output inductor (Lout). The second electronic switch (S3) may be a MOS transistor, a BJT or the like. If the second electronic switch (S3) is a MOS transistor, the second electronic switch (S3) has a gate terminal, a drain terminal, a source terminal and a body diode. The drain terminal of the second electronic switch (S3) is connected to the source terminal of the first electronic switch (S2) and the first end of the output inductor (Lout). The source terminal of the second electronic switch (S3) is connected to the output capacitor (C3).

The control module has a first switch control terminal (G2), a second switch control terminal (G3), a feedback selection detection terminal (VFBS), a first feedback terminal (FB2) and a second feedback terminal (FB3).

In a first embodiment of the present invention, the control module is a programmable processor (21) with the feedback selection detection terminal (VFBS) connected to the secondary winding of the transformer (T1) to determine whether the AC to DC converter (10) outputs the middle level DC power. The first and the second switch control terminals (G2, G3) are connected respectively to the gate terminals of the first and the second electronic switch (S2, S3) and control the first and the second electronic switch (S2, S3) to turn on alternatively. The first feedback terminal (FB2) is connected to the first I/O terminal (201) of the two-way DC to DC converter (20). The second feedback terminal (FB3) is connected to the second I/O terminal (202) of the two-way DC to DC converter (20).

The control module operates in either a forward mode or a backward mode as follows.

1. Forward Mode:

If the AC to DC converter (10) outputs the middle level DC power, the programmable processor (21) treats the first and the second I/O terminals (201, 202) respectively as an input terminal and an output terminal of the two-way DC to DC converter (20). The programmable processor (21) further treats the first and the second electronic switches (S2, S3) as an active switch and a synchronous rectifier switch. When the programmable processor (21) controls the first and the second electronic switches (S2, S3) to turn on alternately, the two-way DC to DC converter (20) operates as a buck converter to transform the middle level DC power to the low level DC power. The programmable processor (21) further obtains a first feedback voltage from the second I/O terminal (202) through the second feedback terminal (FB3) to adjust the turn on periods of the first and the second electronic switches (S2, S3) and maintain the low level DC power stably output from the second I/O terminal (202) based on the first feedback voltage on the second I/O terminal (202). The USB device (40) then obtains the stable low level DC power from the power supply of the present invention.

2. Backward Mode:

If the AC to DC converter (10) does not output the middle level DC power from the feedback selection detection terminal (VFBS) such as when the utility power input to the AC to DC converter (10) is not available, the programmable processor (21) treats the first and the second I/O terminals (201, 202) respectively as the output terminal and the input terminal of the two-way DC to DC converter (20). If an external DC power is input to the second I/O terminal (202), the programmable processor (21) further treats the first and the second electronic switches (S2, S3) as the synchronous rectifier switch and the active switch. When the programmable processor (21) controls the first and the second electronic switches (S2, S3) to turn on alternately, the two-way DC to DC converter (20) operates as a boost converter to transform the external DC power to the middle level DC power. The programmable processor (21) further obtains and determines a second feedback voltage from the first I/O terminal (201) through the first feedback terminal (FB2) to adjust the turn on periods of the first and the second electronic switches (S2, S3) and maintain the middle level DC power stably output from the first I/O terminal (201) based on the second feedback voltage from the first I/O terminal (201). The notebook computer (30) then obtains the stable middle level DC power from the first I/O terminal (201) of the two-way DC to DC converter (20) through the output terminal (102) of the AC to DC converter (10).

Figure 4:
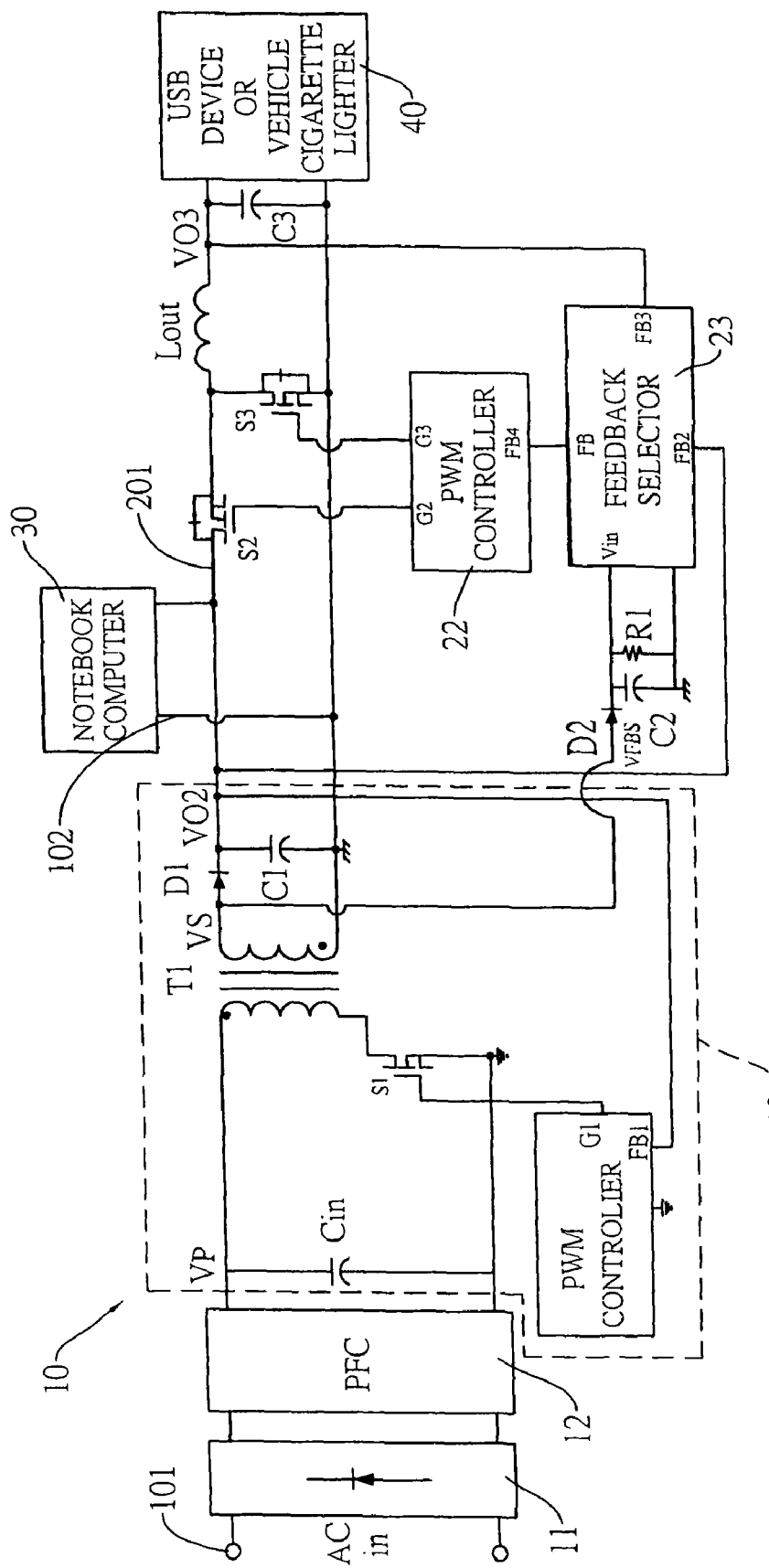
FIG. 4 is a functional block diagram of a second embodiment of the two-way DC to DC converter in FIG. 2.

With further reference to FIG. 4, in a second embodiment of the present invention, the two-way DC to DC converter (20) is similar to the same of the first embodiment. In the second embodiment, the control module is not a single processor but comprises a dual output PWM controller (22), a rectifier diode (D2), a charging capacitor (C2), a resistor (R1) and a feedback selector (23).

The dual output PWM controller (22) has the first switch control terminal (G2), the second switch control terminal (G3) and a feedback input terminal (FB4). Preferably, the dual output PWM controller (22) is low cost and an integrated circuit (IC) numbered TL494. In general, the dual output PWM controller (22) such as the TL494 IC outputs two control signals having the same period. Furthermore, based on principles of controlling general DC to DC converters, the two electronic switches in each DC to DC converter must not be turned on at the same time. That means, the maximum duty cycle for turning on the first electronic switch (S2) or the second electronic switch (S3) must be less than 50% when the dual output PWM controller (22) controls two electronic switches in a general DC to DC converter. Therefore, the first and the second electronic switches (S2, S3) will not be turned on together but will be turned off together because the duty cycle for turning on the first or the second electronic switches (S2, S3) is under 50%.

For example, when the middle level DC power is at 19 volts, the low level DC power is at 5 volts and the external DC power such as from the vehicle cigarette lighter obtained by the second I/O terminal (202) is at a range of 12 to 16 volts, the relationships between input voltage ($V_{IN}$), output voltage ($V_{OUT}$) and the turn on period ($t_{on}$) of the active switch of a buck converter or a boost converter are as follows.

buck converter: $t_{on} = V_{OUT}/V_{IN}$ boost converter: $1 - t_{on} = V_{IN}/V_{OUT}$ When the two-way DC to DC converter (20) operates as a buck converter, the first and the second I/O terminals (201, 202) perform the input and output terminals of the two-way DC to DC converter (20). The duty cycle of the first or the second electronic switches (S2, S3) will be 5/19=26%. When the two-way DC to DC converter (20) operates as a boost converter, the first and the second I/O terminals (201, 202) perform the output and input terminals of the two-way DC to DC converter (20). The duty cycle of the first or the second electronic switches (S2, S3) will be 1−(12/19)=37%. Therefore, the two-way DC to DC converter (20) is capable of converting the middle level DC power at 19 volts to the low level DC power at 5 volts or converting the external DC power at 12 to 16 volts to the middle level DC power at 19 volts even though the duty cycles of the first and the second electronic switches (S2, S3) are under 50%.

The rectifier diode (D2) has an anode and a cathode. The anode of the rectifier diode (D2) performs the feedback selection detection terminal (VFBS) to connect to the AC to DC converter (10).

The charging capacitor (C2) is connected to the cathode of the rectifier diode (D2).

The resistor (R1) is connected to the charging capacitor (C2) in parallel.

The feedback selector (23) has a selection input terminal (Vin), the first feedback terminal (FB2), the second feedback terminal (FB3) and a feedback output terminal (FB). The selection input terminal (Vin) is connected to the charging capacitor (C2) and the resistor (R1). The first feedback terminal (FB2) is connected to the first I/O terminal (201) of the two-way DC to DC converter (20). The second feedback terminal (FB3) is connected to the second I/O terminal (202) of the two-way DC to DC converter (20). The feedback output terminal (FB) is connected to the feedback input terminal (FB4) of the dual output PWM controller (22).

Figure 5A:
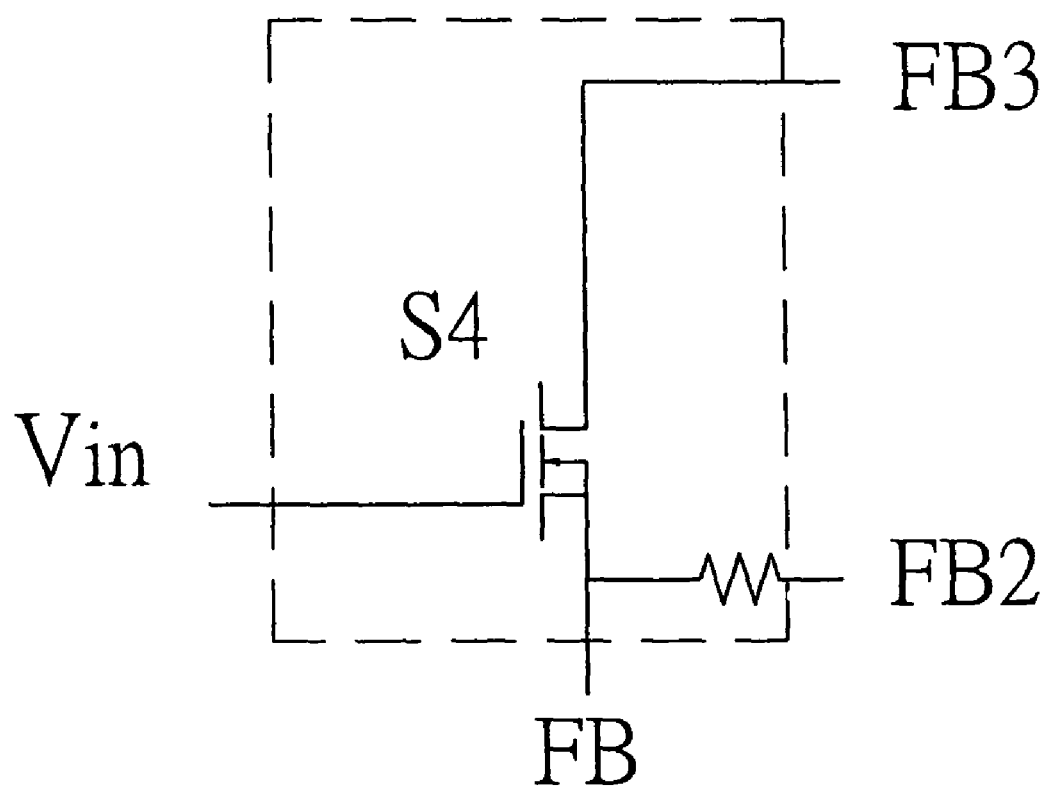
FIG. 5A is a circuit diagram of a feedback selector in FIG. 4.

With further reference to FIG. 5A, the feedback selector (23) may be a transistor switch (S4) in the second embodiment of the present invention. The transistor switch (S4) has a gate terminal as the selection input terminal (Vin), a source terminal as the first feedback terminal (FB2) and a drain terminal as the second feedback terminal (FB3).

Because the dual output PWM controller (22) by itself cannot determine to operate in the forward mode or the backward mode as done by the programmable processor (21) in the first embodiment, the feedback selector (23) assists the dual output PWM controller (22) in obtaining the second feedback voltage or the first feedback voltage respectively on the first I/O terminal (201) or the second I/O terminal (202). The feedback selector (23) obtains either the first or the second feedback voltage and sends it to the feedback input terminal (FB4) of the dual output PWM controller (22).

Figure 5B:
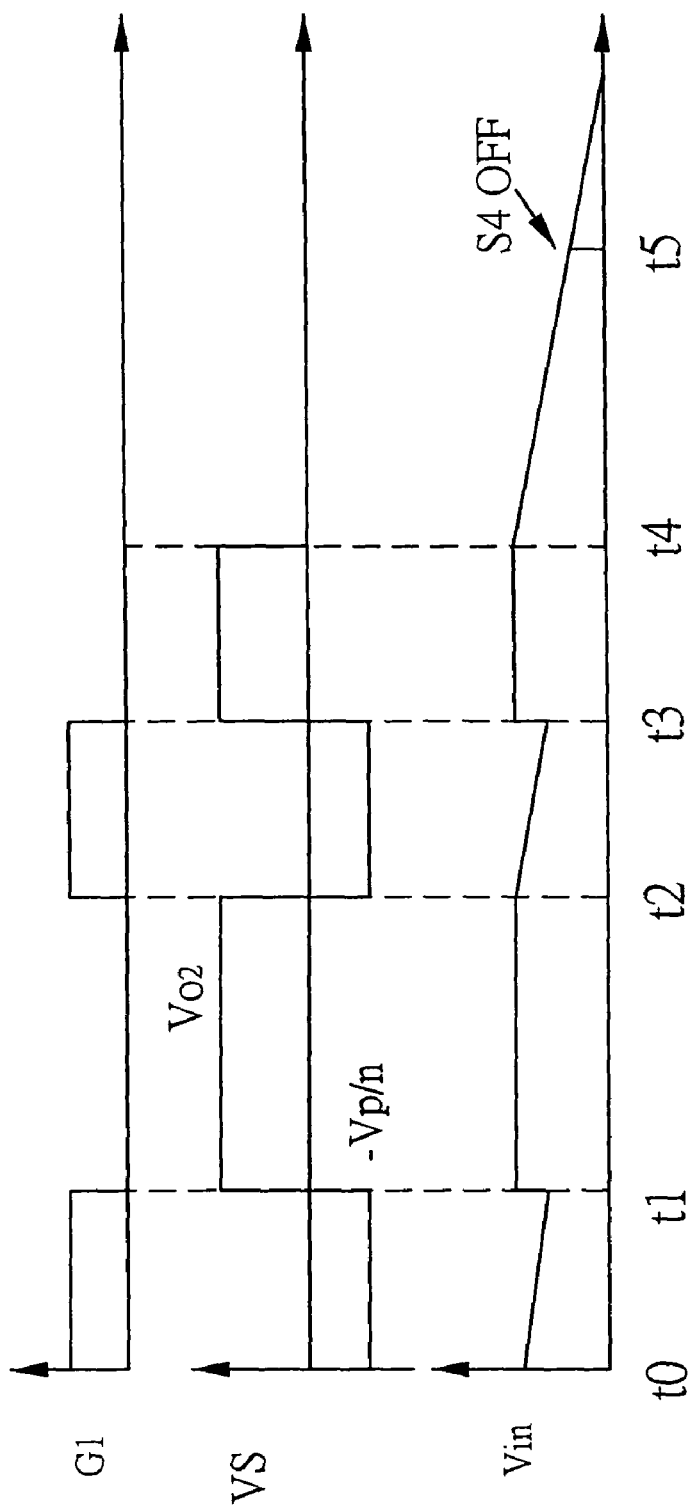
FIG. 5B is a timing diagram of signals from a pulse width modulation (PWM) controller, a secondary winding of a transformer in a switch DC to DC converter and a selection input terminal of the feedback selector in FIG. 4.

With further reference to FIGS. 4 and 5B, when the switch control terminal (G1) of the front PWM controller controls the front electronic switch (S1) in the switch DC to DC converter (13) to operate and output the middle level DC power, a voltage on the secondary winding of the transformer (T1) is nearly identical to the middle level DC power and is input to a rectification circuit composed of the rectifier diode (D2), the charging capacitor (C2) and the resistor (R1). The voltage on the secondary winding of the transformer (T1) in the switch DC to DC converter (13) charges the charging capacitor (C2) as shown in the period from t0 to t4 in FIG. 5B. When a current output from the charging capacitor (C2) flows through the resistor (R1), a cross voltage is generated on the resistor (R1). If the cross voltage on the resistor (R1) is large enough, the transistor switch (S4) will be turned on because the gate terminal of the transistor switch (S4) (i.e. the selection input terminal (Vin) on the feedback selector (23)) is connected to the resistor (R1) to receive the cross voltage. At this time, the control module detects that the AC to DC converter (10) outputs the middle level DC power. When the transistor switch (S4) is turned on, a second feedback voltage on the second I/O terminal (202) will be transmitted to the feedback input terminal (FB4) of the dual output PWM controller (22) through the drain terminal of the transistor switch (S4) (i.e. the second feedback terminal (FB3) of the feedback selector (23)). Therefore, the control module operates in the forward mode so the two-way DC to DC converter (20) operates as a buck converter. The dual output PWM controller (22) adjusts the turn on period of the first electronic switch (S2) to maintain the low level DC power stably output from the second I/O terminal (202) of the two-way DC to DC converter (20) based on the second feedback voltage.

Figure 6:
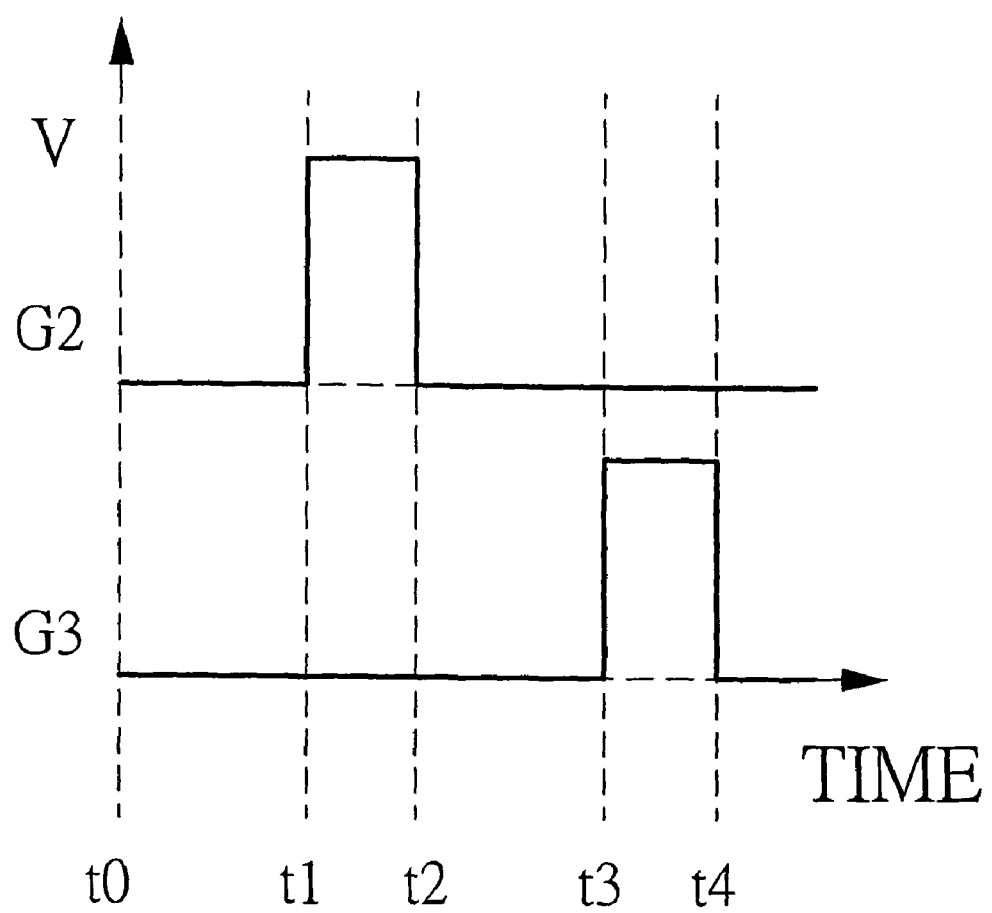
FIG. 6 is a timing diagram of signals from a first and a second switch control terminals on a dual output PWM controller in FIG. 4.
Figure 7A:
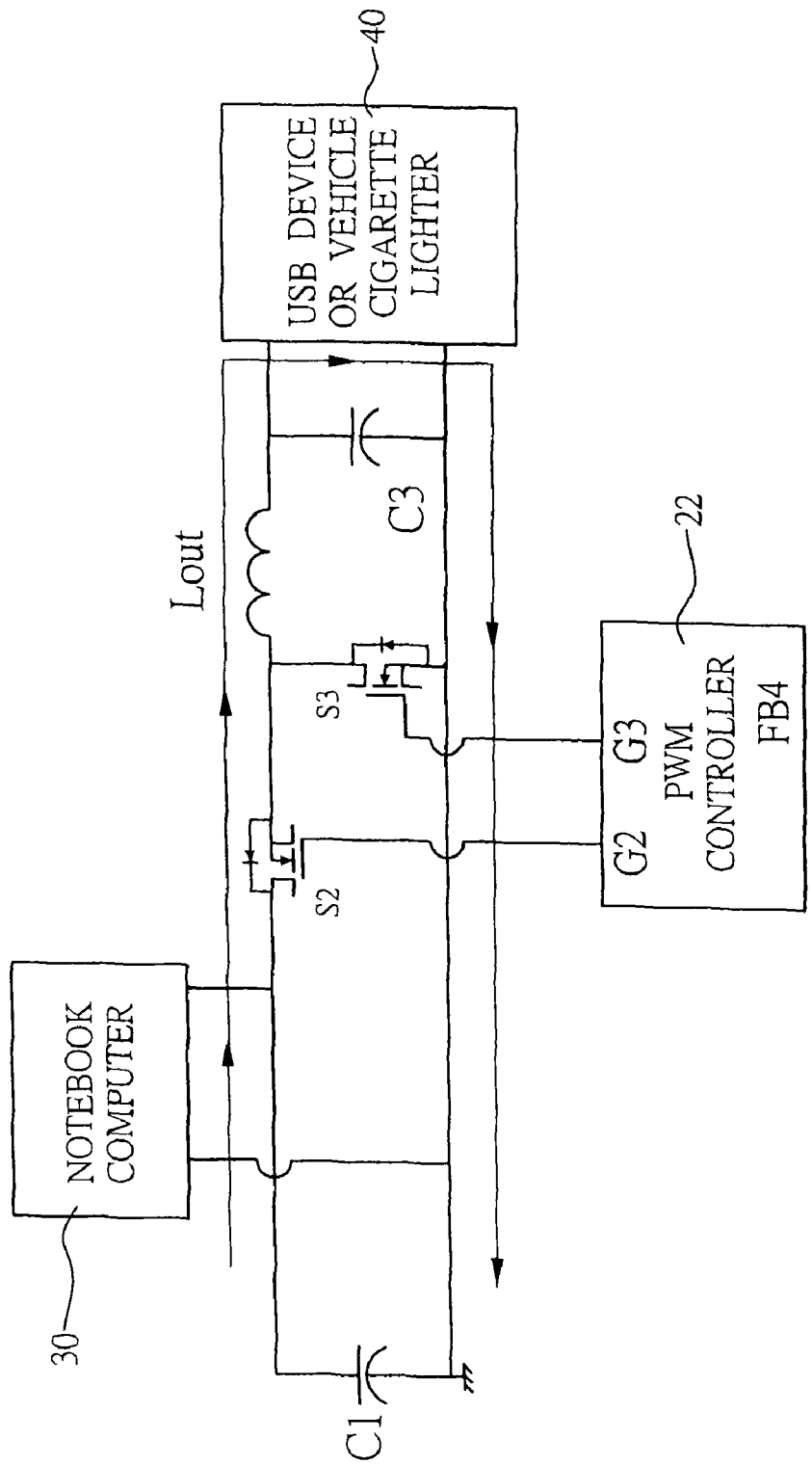
FIGS. 7A to 7C show a current flowing route of the two-way DC to DC converter in FIG. 4 when the two-way DC to DC converter operates in a buck mode.
Figure 7B:
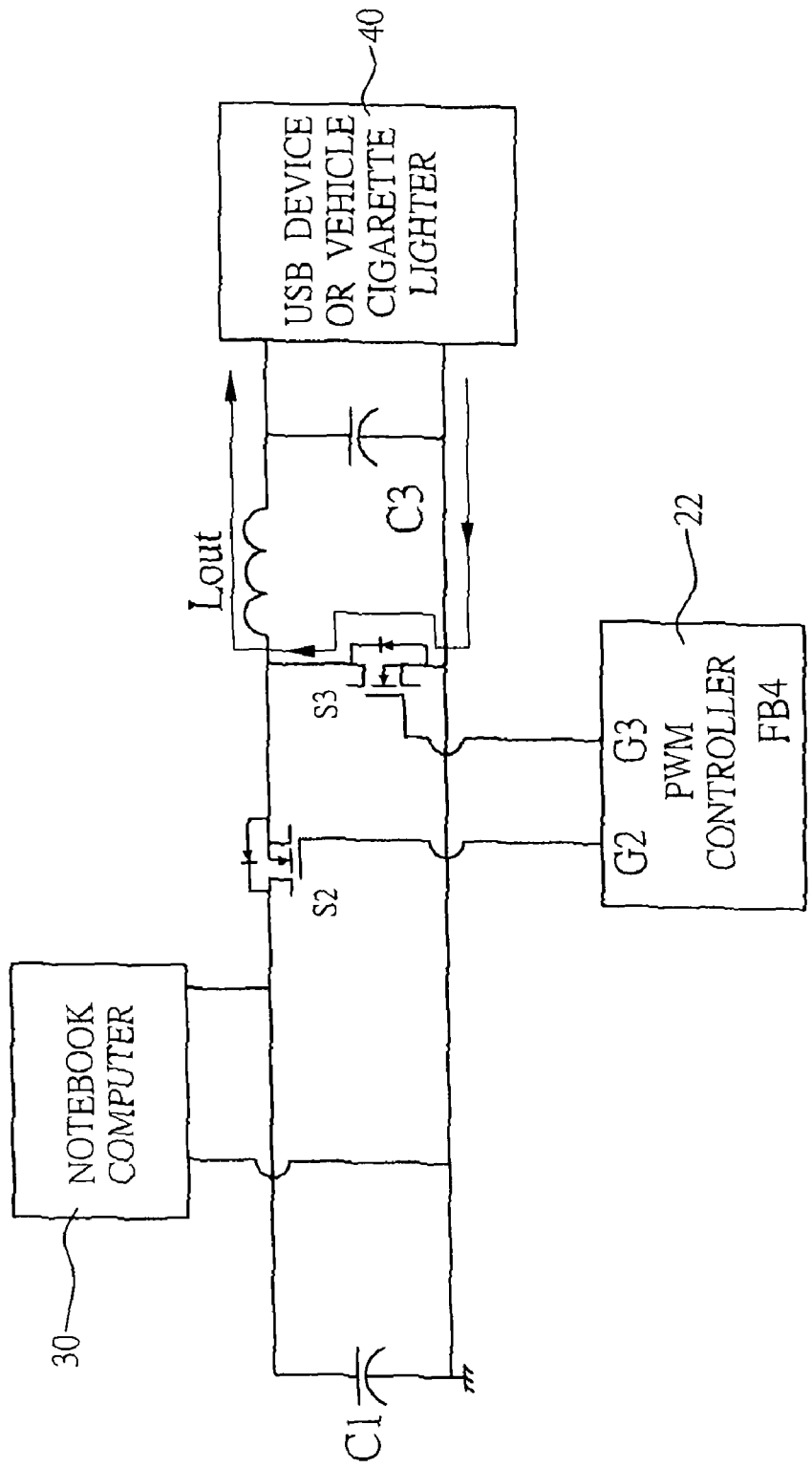
Figure 7C:
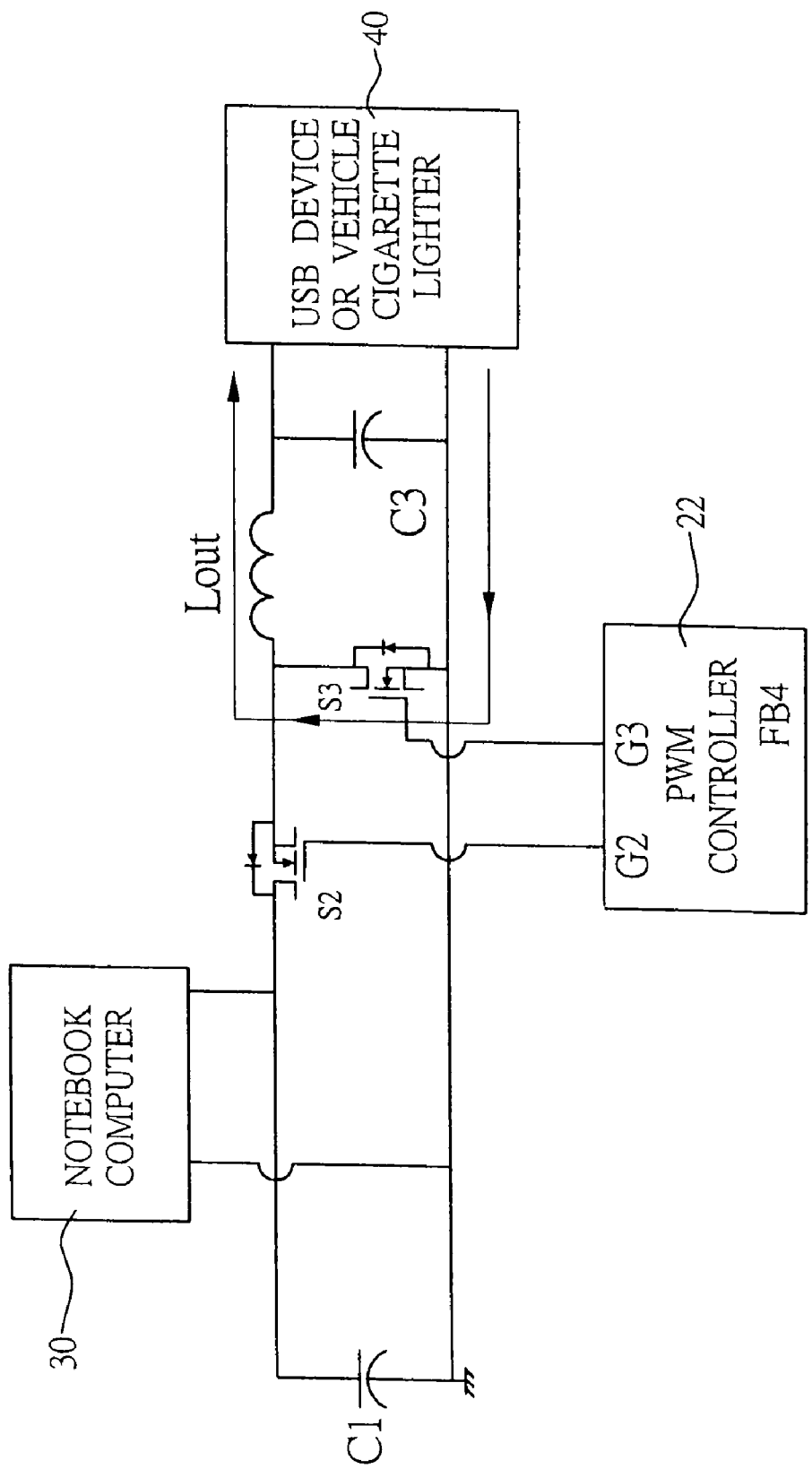

With further reference to FIGS. 6 and 7A to 7C, when the control module operates in the forward mode, the two-way DC to DC converter (20) in the second embodiment operates as follows. A period between t0 to t4 shown in FIG. 6 shows a complete cycle, wherein the period between t0 to t2 is 50% of the complete cycle, and the period between t2 to t4 is the remaining 50% of the complete cycle. The duty cycles of the first and the second electronic switches (S2, S3) are both 26%. In the period between t1 to t2, the first electronic switch (S2) is turned on and the second electronic switch (S3) is turned off so a current will flow through the first electronic switch (S2), the output inductor (Lout) and the second I/O terminal (202) as shown in FIG. 7A. In the period between t2 and t3, the first electronic switches (S2, S3) are turned off so a current will flow through the output inductor (Lout), the second I/O terminal (202) and the body diode of the second electronic switch (S3) as shown in FIG. 7B. In the period between t3 to t4, the first electronic switch (S2) is still turned off and the second electronic switch (S3) is turned on so a current will flow through the output inductor (Lout), the second I/O terminal (202) and the second electronic switch (S3) as shown in FIG. 7C.

Furthermore, when the switch control terminal (G1) of the front PWM controller does not output a signal to the front electronic switch (S1) in the switch DC to DC converter (13), no voltage exists on the secondary winding of the transformer (T1) so the charging capacitor (C2) discharges. When the cross voltage on the resistor (R1) is not enough to turn on the transistor switch (S4) as shown in periods after t5, the control module detects that the AC to DC converter (10) does not output the middle level DC power. The turned off transistor switch (S4) results in that a second feedback voltage on the first I/O terminal (201) of the two-way DC to DC converter (20) will be transmitted to the feedback input terminal (FB4) of the dual output PWM controller (22) through the source terminal of the transistor switch (S4) (i.e. the first feedback terminal (FB2) of the feedback selector (23)). Therefore, the control module operates in the backward mode so the two-way DC to DC converter (20) operates as a boost converter when the second I/O terminal (202) of the two-way DC to DC converter (20) obtains the external DC power. The dual output PWM controller (22) adjusts the turn on period of the second electronic switch (S3) to maintain the middle level DC power stably output from the first I/O terminal (201) of the two-way DC to DC converter (20) based on the first feedback voltage.

Figure 8:
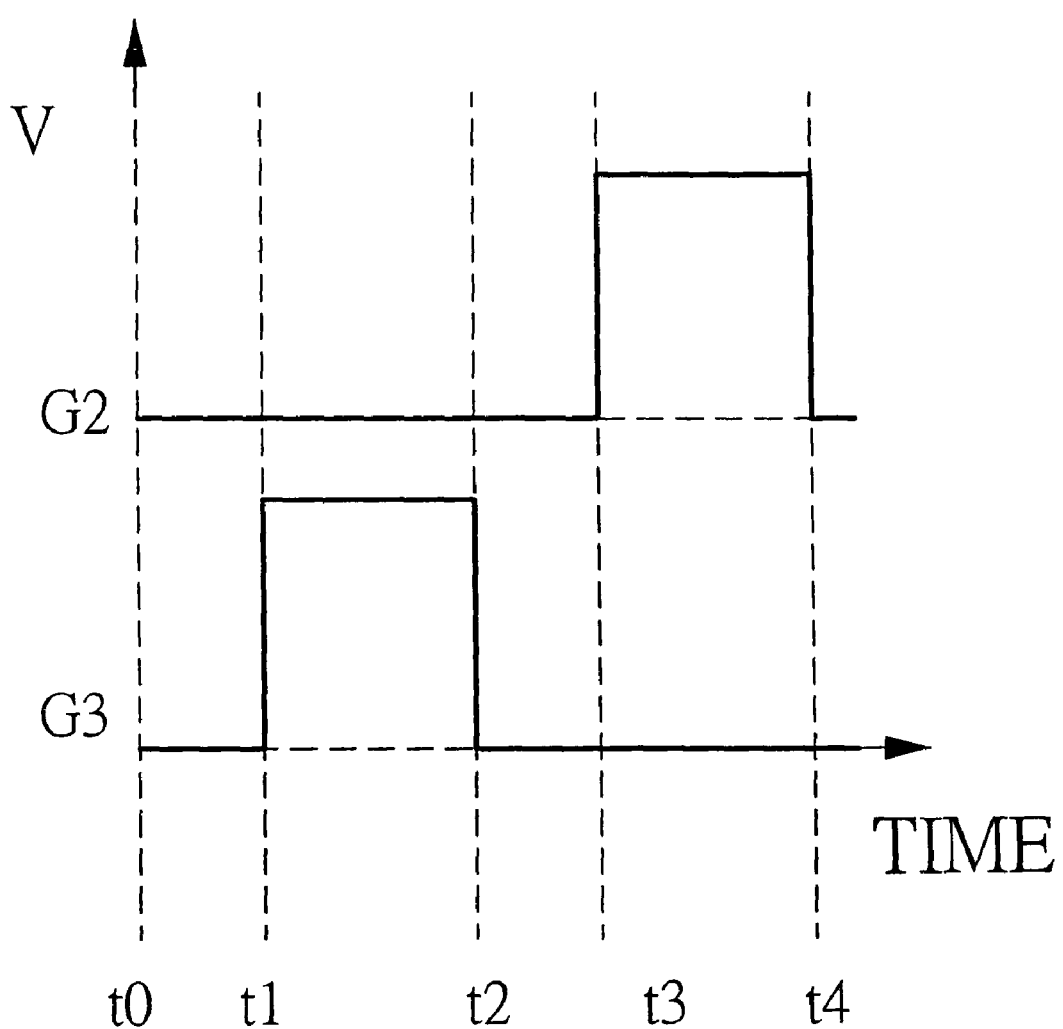
FIG. 8 is another timing diagram of signals from a first and a second switch control terminals on a dual output PWM controller in FIG. 4.
Figure 9A:
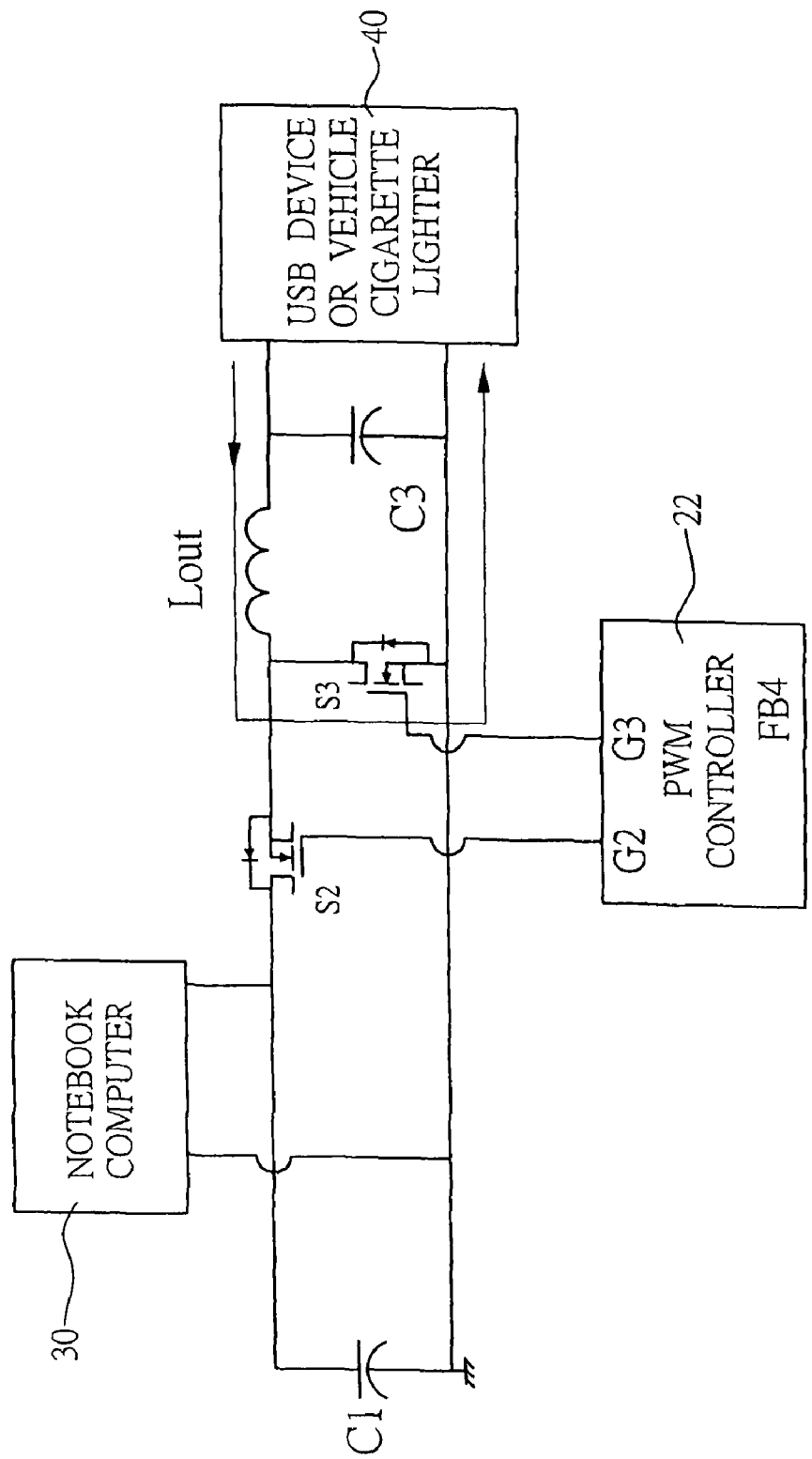
FIGS. 9A to 9C show a current flowing route of the two-way DC to DC converter in FIG. 4 when the two-way DC to DC converter operates in a boost mode.
Figure 9B:
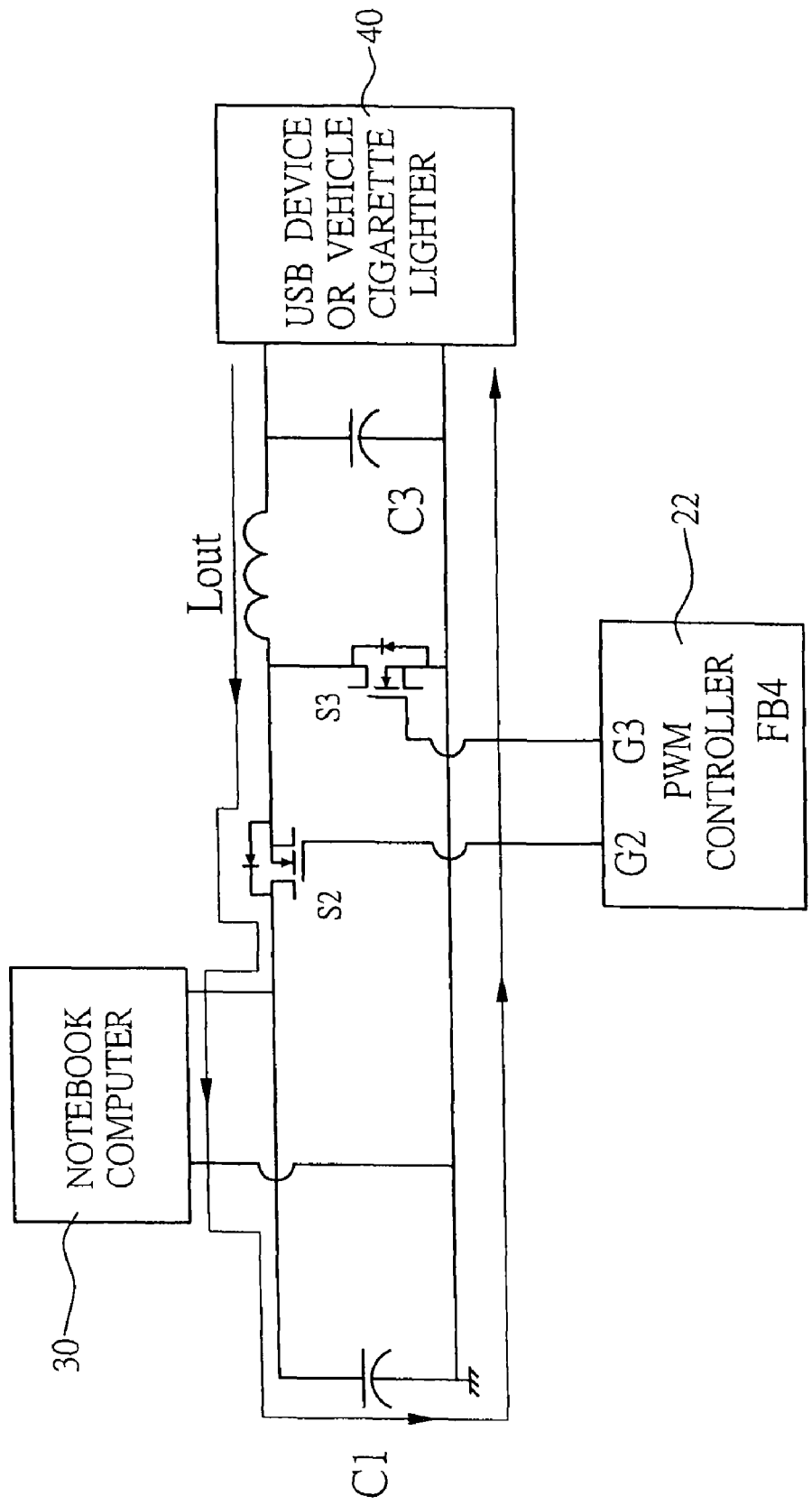
Figure 9C:
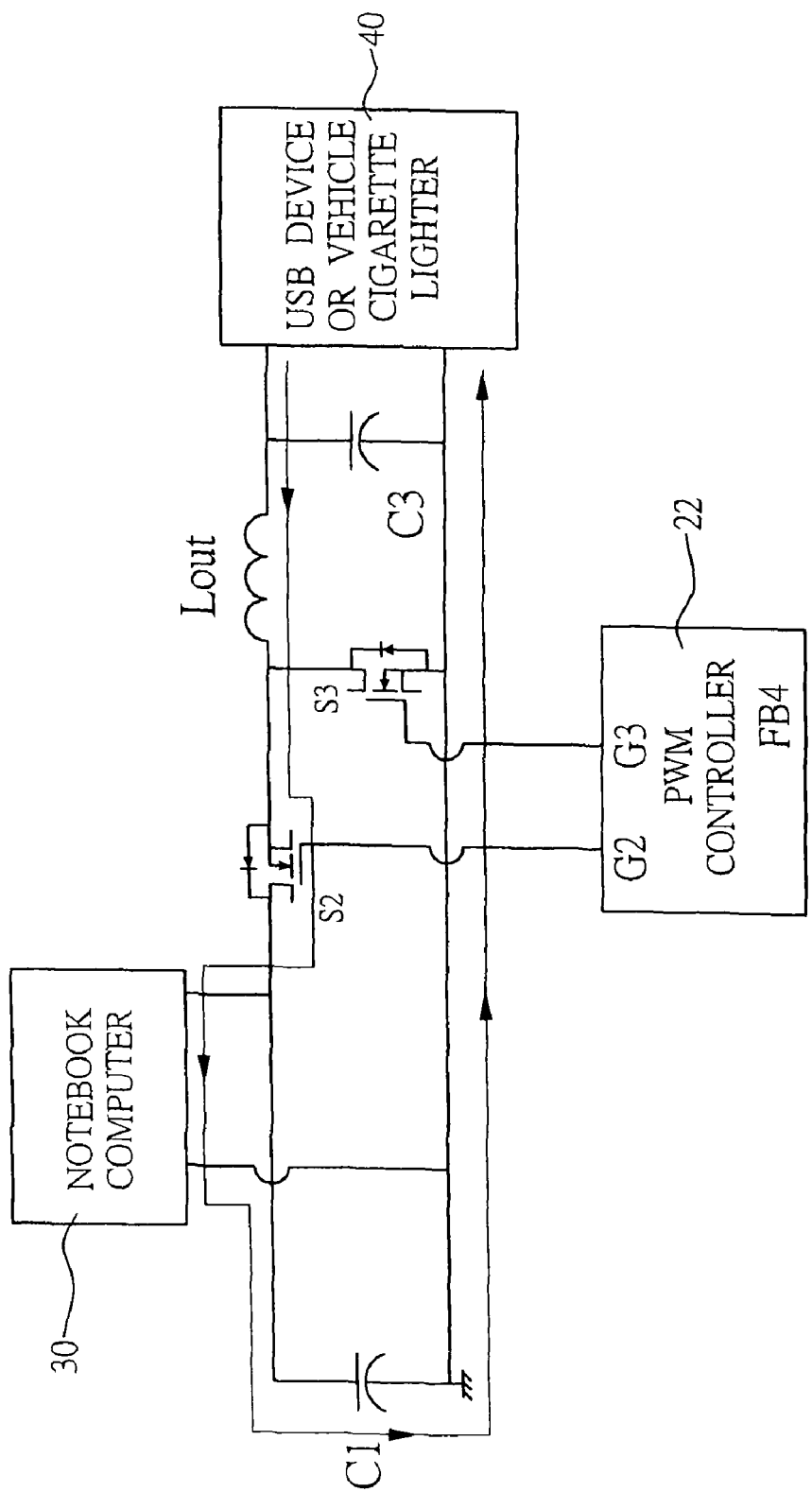

With further reference to FIGS. 8 and 9A to 9C, when the control module operates in the backward mode, the two-way DC to DC converter (20) in the second embodiment operates as follows. A period between t0 to t4 shown in FIG. 8 shows a complete cycle, wherein the period between t0 to t2 is 50% of the complete cycle, and the period between t2 to t4 is the remaining 50% of the complete cycle. The duty cycles of the first and the second electronic switches (S2, S3) are both 37%. In the period between t1 to t2, the second electronic switch (S3) is turned on and the first electronic switch (S2) is turned off so a current will flow through the output inductor (Lout) and the second electronic switch (S3) as shown in FIG. 9A. In the period between t2 to t3, the first and the second electronic switches (S2, S3) are turned off so a current will flow through the output inductor (Lout), the body diode of the first electronic switch (S2) and the first I/O terminal (201) as shown in FIG. 9B. In the period between t3 to t4, the second electronic switch (S3) is still turned off and the first electronic switch (S2) is turned on so a current will flow through the output inductor (Lout), the first electronic switch (S2) and the first I/O terminal (201) as shown in FIG. 9C.

Figure 10:
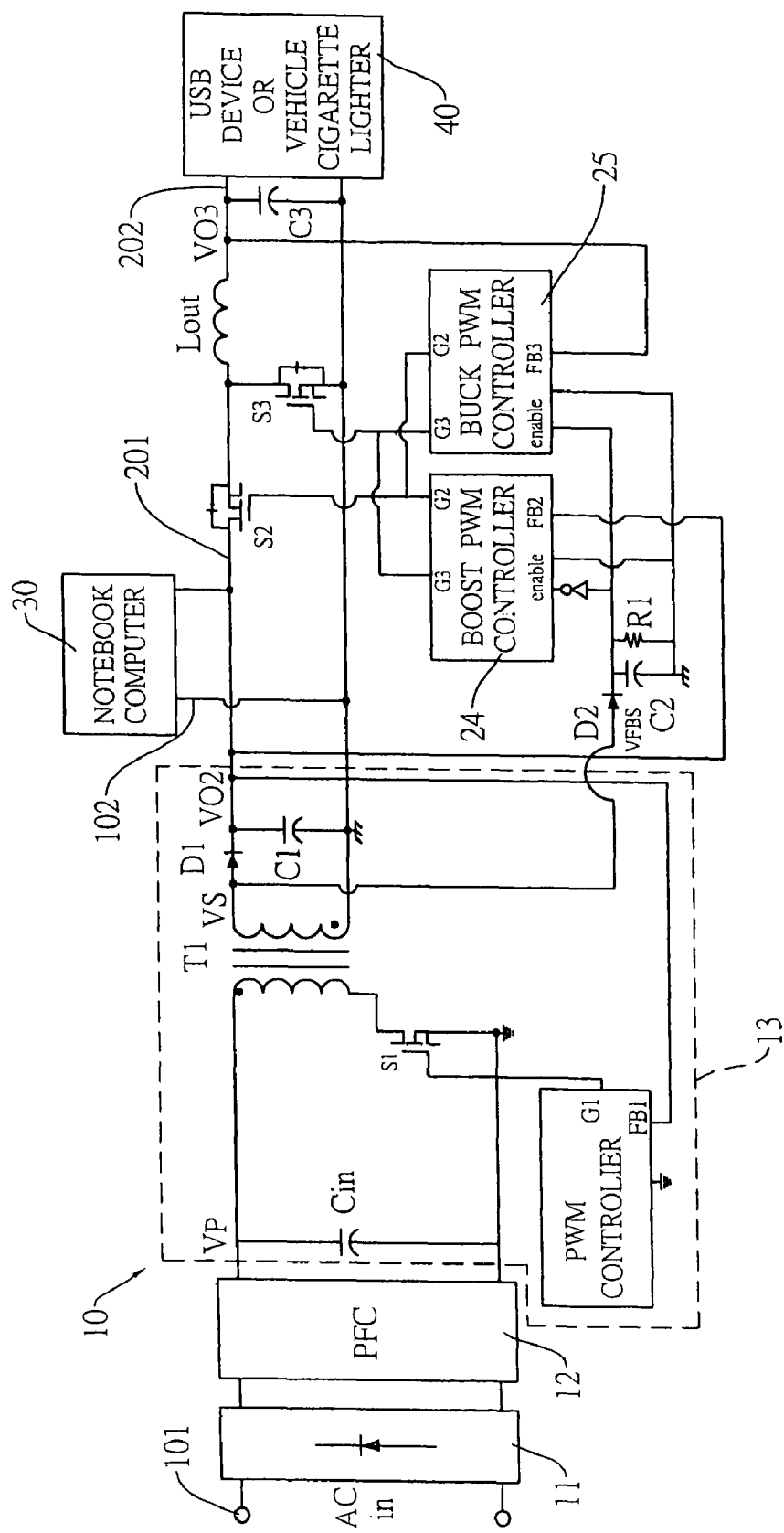
FIG. 10 is a functional block diagram of a third embodiment of the two-way DC to DC converter in FIG. 2.
Figure 11:
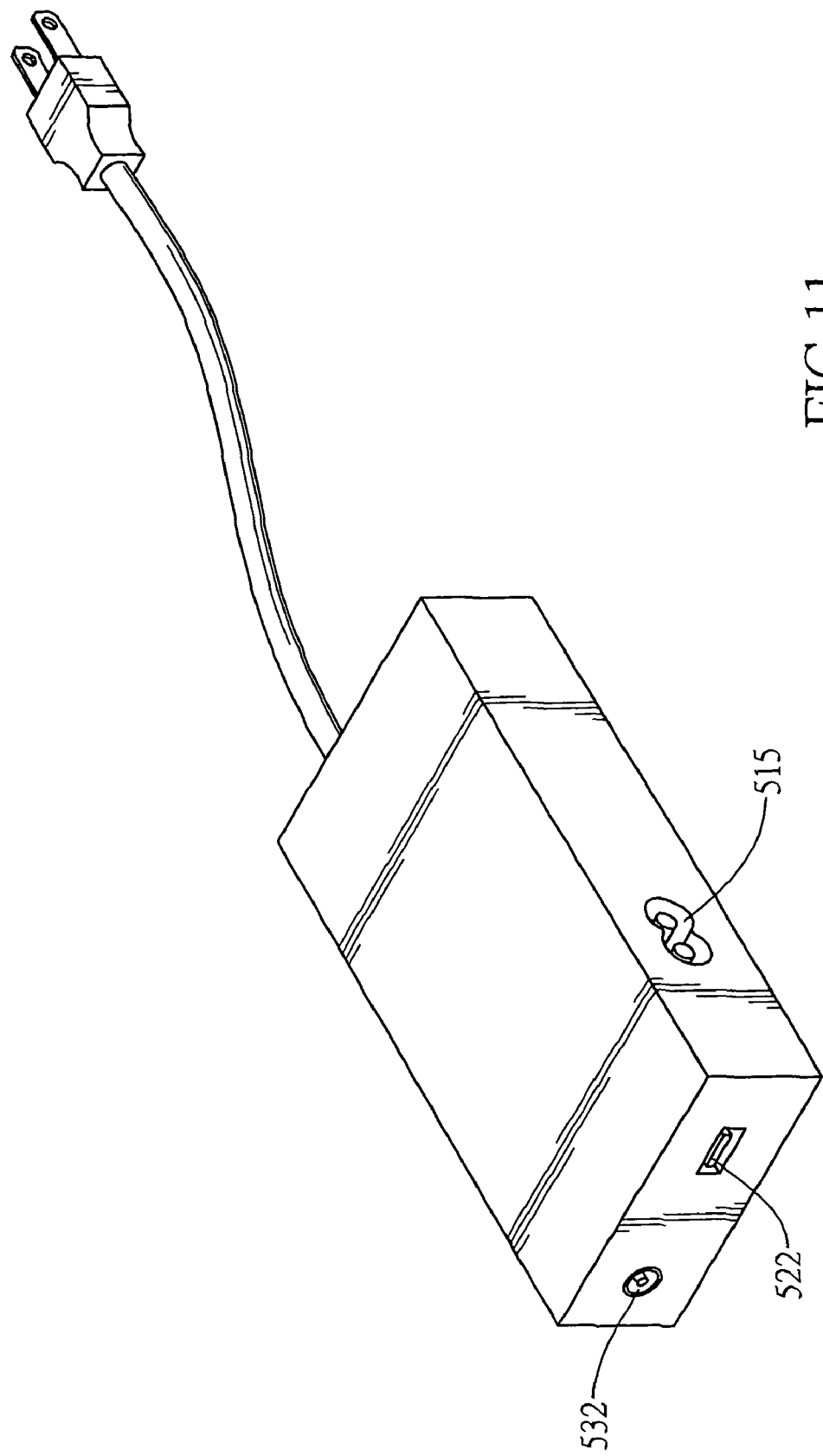
FIG. 11 is a perspective view of a conventional power supply having additional power output and input ports.
Figure 12:
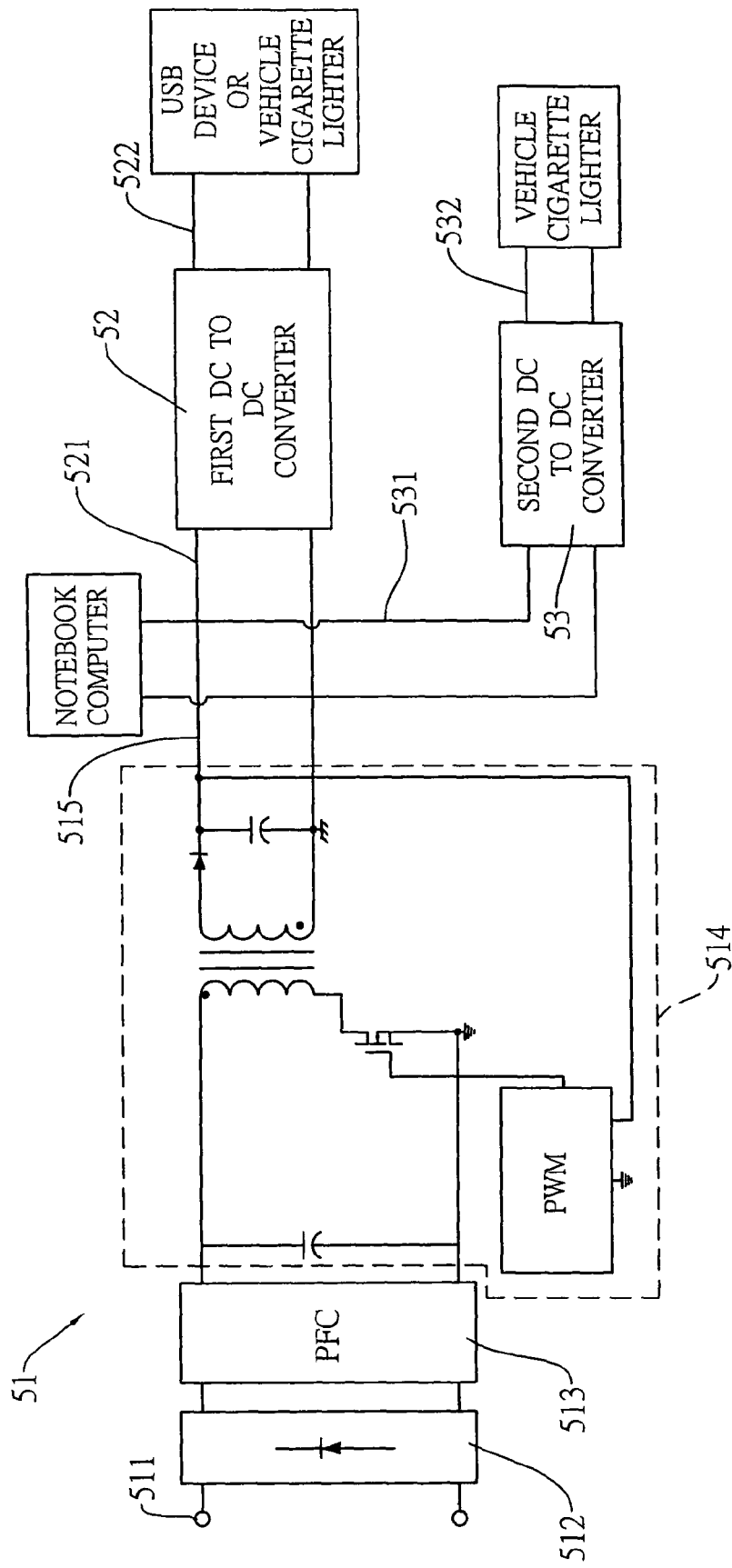
FIG. 12 is a functional block diagram of the conventional power supply in FIG. 11.

With further reference to FIG. 10, in a third embodiment of the present invention, the two-way DC to DC converter (20) is similar to the same in the second embodiment. In the third embodiment, the control module still comprises a rectifier diode (D2), a charging capacitor (C2) and a resistor (R1) but further replaces the dual output PWM controller with a boost PWM controller (24) and a buck PWM controller (25).

The boost PWM controller (24) has an enable terminal (enable), the first feedback terminal (FB2), the first switch control terminal (G2) and the second switch control terminal (G3). The enable terminal (enable) is connected to the charging capacitor (C2) and the resistor (R1) through an inverter. The first feedback terminal (FB2) is connected to the first I/O terminal (201) of the two-way DC to DC converter (20). The first switch control terminal (G2) is connected to the first electronic switch (S2). The second switch control terminal (G3) is connected to the second electronic switch (S3).

The buck PWM controller (25) has an enable terminal (enable), the second feedback terminal (FB3), the first switch control terminal (G2) and the second switch control terminal (G3). The enable terminal (enable) of the buck PWM controller (25) is connected to the charging capacitor (C2) and the resistor (R1). The second feedback terminal (FB3) is connected to the second I/O terminal (202) of the two-way DC to DC converter (20). The first switch control terminal (G2) is connected to the first electronic switch (S2). The second switch control terminal (G3) is connected to the second electronic switch (S3).

When the AC to DC converter (10) outputs the middle level DC power, the voltage on the secondary winding of the transformer (T1) charges the charging capacitor (C2) so the cross voltage of the resistor (R1) is at a high level. The inverter inverts the cross voltage and outputs the inverted cross voltage to the enable terminal (enable) of the boost PWM controller (24). The cross voltage of the resistor (R1) is also directly input to the enable terminal (enable) of the buck PWM controller (25). Therefore, the boost PWM controller (24) does not work but the buck PWM controller (25) works normally. The buck PWM controller (25) treats the first and the second electronic switches (S2, S3) as an active switch and a synchronous rectifier switch and controls the first and the second electronic switches (S2, S3) to turn on alternatively. The control module operates in the forward mode so the two-way DC to DC converter (20) operates as a buck converter.

When the AC to DC converter (10) does not output the middle level DC power, the charging capacitor (C2) discharges. The cross voltage of the resistor (R1) is at a low level. The inverter inverts the cross voltage and outputs the inverted cross voltage to the enable terminal (enable) of the boost PWM controller (24). The cross voltage of the resistor (R1) is also directly input to the enable terminal (enable) of the buck PWM controller (25). Therefore, the buck PWM controller (25) does not work but the boost PWM controller (24) works normally. The boost PWM controller (24) treats the first and the second electronic switches (S2, S3) as the synchronous rectifier switch and the active switch and controls the first and the second electronic switches (S2, S3) to turn on alternatively. The control module operates in the backward mode so the two-way DC to DC converter (20) operates as a boost converter.

Additionally, a limitation that the duty cycles for turning on the first and the second electronic switches (S2, S3) of the two-way DC to DC converter (20) in the third embodiment of the present invention is not required like the second embodiment. However, the two-way DC to DC converter (20) in the third embodiment of the present invention requires more PWM controllers than the two-way DC to DC converter (20) in the second embodiment of the present invention. The two-way DC to DC converter (20) in the second embodiment of the present invention uses only one PWM controller with the feedback selector (23) to control the control module to operate in either the forward mode or the backward mode. Therefore, manufacturing the two-way DC to DC converter (20) in the second embodiment of the present invention costs lower, but the duty cycles for turning on the first and the second electronic switches (S2, S3) in the third embodiment are not limited to under 50%. Consequently, the second and the third embodiments of the present invention provide flexible applications to users, and the users can choose the most suitable application depending on requirements.

With such a power supply of the present invention, the second I/O terminal (202) of the two-way DC to DC converter (20) performs either an output for the low level DC power or an input for the external DC power because the two-way DC to DC converter (20) can operate as either a buck converter when the control module operates in the forward mode or a boost converter when the control module operates in the backward mode. When the utility power is available and is connected to the power supply of the invention, the power supply of the present invention outputs the middle level DC power and the low level DC power. When the utility power is unavailable and the second I/O terminal (202) of the two-way DC to DC converter (20) obtains the external DC power, the power supply of the present invention converts the external DC power to the middle level DC power so the power supply of the present invention still outputs the middle level DC power.

Even though numerous characteristics and advantages of the present invention have been set forth in the foregoing description, together with details of the structure and function of the invention, the disclosure is illustrative only. Changes may be made in detail, especially in matters of arrangement of parts within the principles of the invention to the full extent indicated by the broad general meaning of the terms in which the appended claims are expressed.

What is claimed is:

1. A power supply having a two-way DC to DC converter comprising:
   an AC to DC converter having:
      an input terminal obtaining an AC power so the AC to DC converter rectifies and filters the AC power and converts the AC power to a middle level DC power; and
      an output terminal outputting the middle level DC power;
   a two-way DC to DC converter having:
      a first input and output (I/O) terminal being connected to the output terminal of the AC to DC converter;
      a second I/O terminal;
      an output inductor having a first end and a second end;
      an output capacitor connected to the second end of the output inductor;
      a first electronic switch connected between the output terminal of the AC to DC converter and the first end of the output inductor;
      a second electronic switch connected to the first electronic switch and the first end of the output inductor;
      a control module having:
         a dual output pulse width modulation (PWM) controller having:
            a first switch control terminal connected to the first electronic switch;
            a second switch control terminal connected to the second electronic switch; and
            a feedback input terminal;
         a rectifier diode having:
            an anode used as a feedback selection detection terminal connected to the AC to DC converter so the control module determines whether the AC to DC converter outputs the middle level DC power through the feedback selection terminal; and
            a cathode;
         a charging capacitor connected to the cathode of the rectifier diode;
         a resistor connected to the charging capacitor in parallel; and
         a feedback selector having:
            a selection input terminal connected to the charging capacitor and the resistor;
            a first feedback terminal connected to and obtaining a second feedback voltage on the first I/O terminal of the two-way DC to DC converter;
            a second feedback terminal connected to and obtaining a first feedback voltage on the second I/O terminal of the two-way DC to DC converter; and
            a feedback output terminal connected to the feedback input terminal of the dual output PWM controller; and
   wherein when the control module determines that the AC to DC converter outputs the middle level DC power, the control module treats the first electronic switch as an active switch, obtains the first feedback voltage, and adjusts a turn-on period of the first electronic switch to maintain the low level DC power stably output from the second I/O terminal of the two-way DC to DC converter based on the first feedback voltage so the two-way DC to DC converter operates as a buck converter;
   wherein when the control module determines that the AC to DC converter does not output the middle level DC power and the second I/O terminal of the two-way DC to DC converter obtains an external DC power, the control module treats the second electronic switch as an active switch, obtains the second feedback voltage, and adjusts a turn-on period of the second electronic switch to maintain the middle level DC power stably output from the first I/O terminal of the two-way DC to DC converter based on the second feedback voltage so the two-way DC to DC converter operates as a boost converter; and
   wherein the feedback selector assists the dual output PWM controller in obtaining either the first feedback voltage or the second feedback voltage based on whether the AC to DC converter outputs the middle level DC power.

2. The power supply as claimed in claim 1, wherein the AC to DC converter comprises:
a full-wave rectifier being connected to the input terminal of the AC to DC converter and obtaining and rectifying the AC power to a DC power;
a power factor correction (PFC) circuit being connected to the full-wave rectifier and correcting power factors of the DC power from the full-wave rectifier; and
a switch DC to DC converter being connected to the PFC circuit and the output terminal of the AC to DC converter, converting the corrected DC power from the PFC circuit to a middle level DC power, and transmitting the middle level DC power to the output terminal of the AC to DC converter.

3. The power supply as claimed in claim 1, wherein the control module is a programmable processor.

4. The power supply as claimed in claim 1, wherein the dual output PWM controller controls the first and the second electronic switches to turn on based on duty cycles both under 50%.

5. The power supply as claimed in claim 1, wherein the feedback selector is a transistor switch having:
a gate terminal performing the selection input terminal;
a source terminal performing the first feedback terminal and the feedback output terminal; and
a drain terminal performing the second feedback terminal.

6. The power supply as claimed in claim 5, wherein the AC to DC converter comprises:
a full-wave rectifier being connected to the input terminal of the AC to DC converter and obtaining and rectifying the AC power to a DC power;
a power factor correction (PFC) circuit being connected to the full-wave rectifier and correcting power factors of the DC power from the full-wave rectifier; and
a switch DC to DC converter being connected to the PFC circuit and the output terminal of the AC to DC converter, converting the corrected DC power from the PFC circuit to a middle level DC power, and transmitting the middle level DC power to the output terminal of the AC to DC converter.

7. The power supply as claimed in claim 5, wherein the dual output PWM controller controls the first and the second electronic switches to turn on based on duty cycles both under 50%.

8. The power supply as claimed in claim 7, wherein the AC to DC converter comprises:
a full-wave rectifier being connected to the input terminal of the AC to DC converter and obtaining and rectifying the AC power to a DC power; and
a switch DC to DC converter being connected to the full-wave rectifier and the output terminal of the AC to DC converter, converting the DC power from the full-wave rectifier to a middle level DC power, and transmitting the middle level DC power to the output terminal of the AC to DC converter.

9. The power supply as claimed in claim 7, wherein the AC to DC converter comprises:
a full-wave rectifier being connected to the input terminal of the AC to DC converter and obtaining and rectifying the AC power to a DC power;
a power factor correction (PFC) circuit being connected to the full-wave rectifier and correcting power factors of the DC power from the full-wave rectifier; and
a switch DC to DC converter being connected to the PFC circuit and the output terminal of the AC to DC converter, converting the corrected DC power from the PFC circuit to a middle level DC power, and transmitting the middle level DC power to the output terminal of the AC to DC converter.

10. The power supply as claimed in claim 5, wherein the AC to DC converter comprises:
a full-wave rectifier being connected to the input terminal of the AC to DC converter and obtaining and rectifying the AC power to a DC power; and
a switch DC to DC converter being connected to the full-wave rectifier and the output terminal of the AC to DC converter, converting the DC power from the full-wave rectifier to a middle level DC power, and transmitting the middle level DC power to the output terminal of the AC to DC converter.

11. The power supply as claimed in claim 1, wherein the AC to DC converter comprises:
a full-wave rectifier being connected to the input terminal of the AC to DC converter and obtaining and rectifying the AC power to a DC power; and
a switch DC to DC converter being connected to the full-wave rectifier and the output terminal of the AC to DC converter, converting the DC power from the full-wave rectifier to a middle level DC power, and transmitting the middle level DC power to the output terminal of the AC to DC converter.

12. A power supply having a two-way DC to DC converter comprising:
an AC to DC converter having:
an input terminal obtaining an AC power so the AC to DC converter rectifies and filters the AC power and converts the AC power to a middle level DC power; and
an output terminal outputting the middle level DC power;
a two-way DC to DC converter having:
a first input and output (I/O) terminal being connected to the output terminal of the AC to DC converter;
a second I/O terminal;
an output inductor having a first end and a second end;
an output capacitor being connected to the second end of the output inductor;
a first electronic switch being connected between the output terminal of the AC to DC converter and the first end of the output inductor;
a second electronic switch being connected to the first electronic switch and the first end of the output inductor;
a control module having:
a rectifier diode having:
an anode performing a feedback selection detection terminal being connected to the AC to DC converter so the control module determines whether the AC to DC converter outputs the middle level DC power through the feedback selection detection terminal; and
a cathode;
a charging capacitor being connected to the cathode of the rectifier diode;
a resistor being connected to the charging capacitor in parallel;
a boost PWM controller having:
an enable terminal being connected to the charging capacitor and the resistor through an inverter;
a first feedback terminal being connected to the first I/O terminal of the two-way DC to DC converter;

a first switch control terminal being connected to the first electronic switch; and
a second switch control terminal being connected to the second electronic switch;
a buck PWM controller having:
an enable terminal being connected to the charging capacitor and the resistor;
a second feedback terminal being connected to the second I/O terminal of the two-way DC to DC converter;
a first switch control terminal being connected to the first electronic switch; and
a second switch control terminal being connected to the second electronic switch;
wherein when the AC to DC converter outputs the middle level DC power, the boost PWM controller does not work but the buck PWM controller works normally to control the two-way DC to DC converter to operate as a buck converter; and
wherein when the AC to DC converter does not output the middle level DC power and the second I/O terminal of the two-way DC to DC converter obtains an external DC power, the buck PWM controller does not work but the boost PWM controller works normally to control the two-way DC to DC converter to operate as a boost converter.

13. The power supply as claimed in claim 12, wherein the AC to DC converter comprises:
a full-wave rectifier being connected to the input terminal of the AC to DC converter and obtaining and rectifying the AC power to a DC power; and
a switch DC to DC converter being connected to the full-wave rectifier and the output terminal of the AC to DC converter, converting the DC power from the full-wave rectifier to a middle level DC power, and transmitting the middle level DC power to the output terminal of the AC to DC converter.

14. The power supply as claimed in claim 12, wherein the AC to DC converter comprises:
a full-wave rectifier being connected to the input terminal of the AC to DC converter and obtaining and rectifying the AC power to a DC power;
a power factor correction (PFC) circuit being connected to the full-wave rectifier and correcting power factors of the DC power from the full-wave rectifier; and
a switch DC to DC converter being connected to the PFC circuit and the output terminal of the AC to DC converter, converting the corrected DC power from the PFC circuit to a middle level DC power, and transmitting the middle level DC power to the output terminal of the AC to DC converter.

* * * * *